(12) United States Patent
Macey et al.

(10) Patent No.: US 11,975,674 B2
(45) Date of Patent: May 7, 2024

(54) AIRBAG SYSTEMS FOR AUTONOMOUS VEHICLES

(71) Applicant: Waymo LLC, Mountain View, CA (US)

(72) Inventors: Stuart Macey, Laguna Niguel, CA (US); Wenyu Lian, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/850,290

(22) Filed: Jun. 27, 2022

(65) Prior Publication Data

US 2023/0192025 A1 Jun. 22, 2023

Related U.S. Application Data

(60) Provisional application No. 63/290,883, filed on Dec. 17, 2021.

(51) Int. Cl.
*B60R 21/233* (2006.01)
*B60R 21/239* (2006.01)

(52) U.S. Cl.
CPC .......... *B60R 21/233* (2013.01); *B60R 21/239* (2013.01); *B60R 2021/23308* (2013.01); *B60R 2021/23324* (2013.01)

(58) Field of Classification Search
CPC ............ B60R 21/01554; B60R 21/207; B60R 21/233; B60R 21/239; B60R 21/263; B60R 2021/01225; B60R 2021/01231; B60R 2021/161; B60R 2021/23107; B60R 2021/23153; B60R 2021/23308; B60R 2021/23324; B60R 2021/26094; B60R 21/261; B60R 2021/2612; B60R 2021/2615
See application file for complete search history.

(56) References Cited

U.S. PATENT DOCUMENTS 3,642,303 A * 2/1972 Irish .................... B60R 21/233 280/730.1
3,768,830 A * 10/1973 Hass .................... B60R 21/233 280/732

(Continued)

FOREIGN PATENT DOCUMENTS

JP 04166455 A * 6/1992
JP 05310095 A * 11/1993

(Continued)

*Primary Examiner* — Laura Freedman
(74) *Attorney, Agent, or Firm* — Botos Churchill IP Law

(57) ABSTRACT

Aspects of the disclosure provide for airbag systems suited for autonomous vehicles. Such an airbag system may include a first chamber, a second chamber, a dual-stage inflator, an orifice blocker mechanism and a control module. The dual-stage inflator may be in fluid communication with the first chamber via a first orifice and in fluid communication with the second chamber via a second orifice. The orifice blocker mechanism may be configured to block and unblock gas flow from the second orifice to the second chamber. The control module may be configured to activate the dual-stage inflator in order to inflate one or both of the first chamber and the second chamber with gas based on a position of the orifice blocker mechanism relative to the second orifice.

20 Claims, 15 Drawing Sheets

(56) References Cited

U.S. PATENT DOCUMENTS

| | | | |
|---|---|---|---|
| 5,082,326 A | | 1/1992 | Sekido et al. |
| 5,364,125 A | * | 11/1994 | Brown .............. B60R 21/01554 |
| | | | 280/736 |
| 5,738,368 A | * | 4/1998 | Hammond .............. B60N 2/68 |
| | | | 280/730.1 |
| 6,199,951 B1 | * | 3/2001 | Zeile .................... B60N 2/3011 |
| | | | 297/378.12 |
| 8,376,396 B2 | * | 2/2013 | Miller ................... B60R 21/206 |
| | | | 280/736 |
| 8,590,928 B2 | | 11/2013 | Spahn et al. |
| 8,924,086 B2 | | 12/2014 | Thomas |
| 9,296,358 B2 | * | 3/2016 | Chen ..................... B60R 21/205 |
| 9,308,883 B1 | * | 4/2016 | Schneider ............. B60R 21/231 |
| 9,409,539 B2 | * | 8/2016 | Nagasawa ........... B60R 21/0134 |
| 9,527,417 B2 | * | 12/2016 | Dry .......................... B60N 2/58 |
| 9,573,554 B2 | * | 2/2017 | Nagasawa ............. B60N 2/7094 |
| 9,610,872 B2 | * | 4/2017 | Dry ........................ B60N 2/914 |
| 9,643,521 B2 | * | 5/2017 | Frommann ........ B60N 2/42718 |
| 9,676,355 B2 | * | 6/2017 | Kruse ................. B60R 21/2338 |
| 9,707,921 B2 | | 7/2017 | Fischer et al. |
| 10,246,042 B2 | * | 4/2019 | Sumiya ................. B60R 21/239 |
| 10,363,852 B2 | * | 7/2019 | Strumolo ................ B60N 2/002 |
| 10,434,966 B2 | * | 10/2019 | Ghannam ........... B60R 21/0136 |
| 10,836,337 B2 | | 11/2020 | Shin et al. |
| 10,864,877 B2 | * | 12/2020 | Nagasawa ........ B60R 21/01552 |
| 11,007,964 B2 | * | 5/2021 | Tanaka ................. B60R 21/207 |
| 2006/0267325 A1 | | 11/2006 | Kumagai et al. |

FOREIGN PATENT DOCUMENTS

| | | | |
|---|---|---|---|
| JP | 10053091 A | * | 2/1998 |
| JP | 4151453 B2 | | 7/2008 |

* cited by examiner

AIRBAG SYSTEMS FOR AUTONOMOUS VEHICLES

CROSS-REFERENCE

The present application claims the benefit of the filing date of U.S. Provisional Application No. 63/290,883, filed Dec. 17, 2021, the entire disclosure of which is incorporated by reference herein.

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings while avoiding collisions with other objects.

When a collision actually occurs, non-autonomous and autonomous vehicles alike may include various safety mechanisms to reduce injury to passengers. Typically, the safety mechanisms may include airbag systems employed to protect passengers from impacts with the interior of a vehicle after an object external to a vehicle has impacted the vehicle.

BRIEF SUMMARY

Aspects of the disclosure provide an airbag system. The airbag system includes a first chamber; a second chamber; a dual-stage inflator in fluid communication with the first chamber via a first orifice and in fluid communication with the second chamber via a second orifice; an orifice blocker mechanism configured to block and unblock gas flow from the second orifice to the second chamber; and a control module configured to activate the dual-stage inflator in order to inflate one or both of the first chamber and the second chamber with gas based on a position of the orifice blocker mechanism relative to the second orifice.

In one example, each of the first chamber and the second chamber include a respective vent configured to vent the gas. In another example, the first chamber and the second chamber are chambers of a single airbag. In another example, the first chamber and the second chamber are chambers of distinct airbags. In another example, the orifice blocker mechanism is configured to block and unblock the gas flow depending on a relative rotation of the orifice blocker mechanism. In this example, the method also includes a seat including a seatback and a base, wherein the seatback and orifice blocker mechanism are arranged such that rotation of the seatback relative to the base causes the orifice blocker mechanism to rotate. In addition, the first and second chambers are arranged in a housing of the seatback prior to the inflation. In addition, or alternatively, the orifice blocker mechanism is configured to block and unblock gas flow by rotating about a folding axis of the seat. In addition, or alternatively, the seatback and the orifice blocker mechanism are arranged such that when the seatback is in an upright position, the orifice blocker mechanism blocks one of the first or second orifices. In this example, the seatback and the orifice blocker mechanism are arranged such that when the seatback is in a folded position, the orifice blocker mechanism does not block the gas flow from the second orifice to the second chamber. In addition, or alternatively, the dual-stage inflator is configured to activate a first stage in order to initially inflate one of the first chamber or the second chamber when the seatback is in an upright position such that only the first chamber can inflate sufficiently to provide protection for an occupant of a vehicle. In this example, the dual-stage inflator is configured to activate a first stage in order to inflate both of the first chamber and the second chamber when the seatback is in a folded position that both the first chamber and the second chamber can inflate sufficiently to provide protection for an occupant of a vehicle. In another example, the system also includes a vehicle; a first seat in which the first and second chambers are arranged in the first seat prior to the inflation; and a second seat located behind the first seat, wherein the first chamber and the second chamber are sized to protect an occupant of the vehicle in the second seat when one or both of the first chamber and the second chamber with gas based on a position of the orifice blocker mechanism. In this example, the first seat includes a seatback and a base, wherein the seatback and orifice blocker mechanism are arranged such that rotation of the seatback relative to the base causes the orifice blocker mechanism to rotate. In addition, or alternatively, the first and second chambers are arranged in the seatback prior to the inflation. In addition, or alternatively, orifice blocker mechanism is configured to block and unblock one of the first orifice or the second orifice by rotating about a folding axis of the first seat. In addition, or alternatively, the seatback and the orifice blocker mechanism are arranged such that when the seatback is in an upright position, the orifice blocker mechanism is configured to blocks the gas flow from the second orifice to the second chamber. In this example, the seatback and the orifice blocker mechanism are arranged such that when the seatback is in a folded position, the orifice blocker mechanism is configured to not block gas flow from the second orifice to the second chamber. In addition, or alternatively, the dual-stage inflator is configured to activate a first stage in order to initially inflate one of the first chamber or the second chamber when the seatback is in an upright position such that only the first chamber can inflate sufficiently to provide protection for an occupant of a vehicle. In this example, the dual-stage inflator is configured to activate a first stage in order to inflate both of the first chamber and the second chamber when the seatback is in a folded position that both the first chamber and the second chamber can inflate sufficiently to provide protection for an occupant of a vehicle.

DETAILED DESCRIPTION

Overview

The technology relates to airbag systems for autonomous vehicles. Because autonomous vehicles may not require a human driver or someone who can readily access a steering wheel and/or pedals of a typical road vehicle, this may allow for different seating configurations. When a passenger sits in a non-standard position, or a vehicle includes non-standard seating configuration, such as in an autonomous vehicle, traditional airbags may not be sufficient to effectively protect a passenger in the event of a collision.

Figure 14:
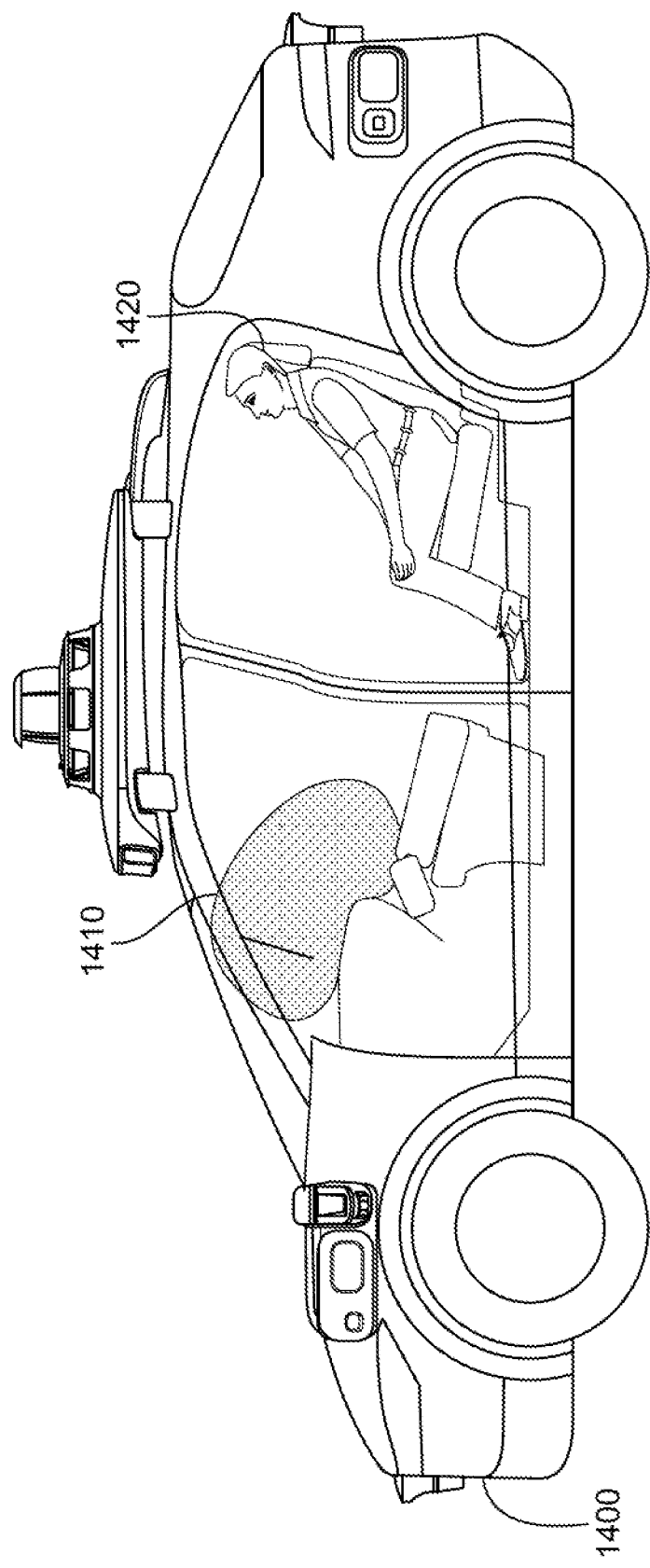
FIG. 14 is a side view of an interior of an autonomous vehicle in accordance with aspects of the disclosure.

For instance, when one or both seats of the first row of seating row seats are in a fully folded position, occupants in the second row of seating, and in particularly those that may be unbelted (i.e., not wearing seatbelts) may have less safety protection in the event of a frontal crash of a vehicle. This is because typical frontal airbags located in front of the first row of seating may not be configured to reach occupants in the second row of seating. For example, as shown in FIG. 14, a dashboard airbag 1410 may not provide adequate protection for the occupant 1420 of a vehicle 1400.

Moreover, seatback airbags that may be incorporated into the seats of the first row of seating may only be intended for deployment when in an upright position. Thus, when the seatback is in a folded condition, may provide almost no protection for occupants.

Figure 15:
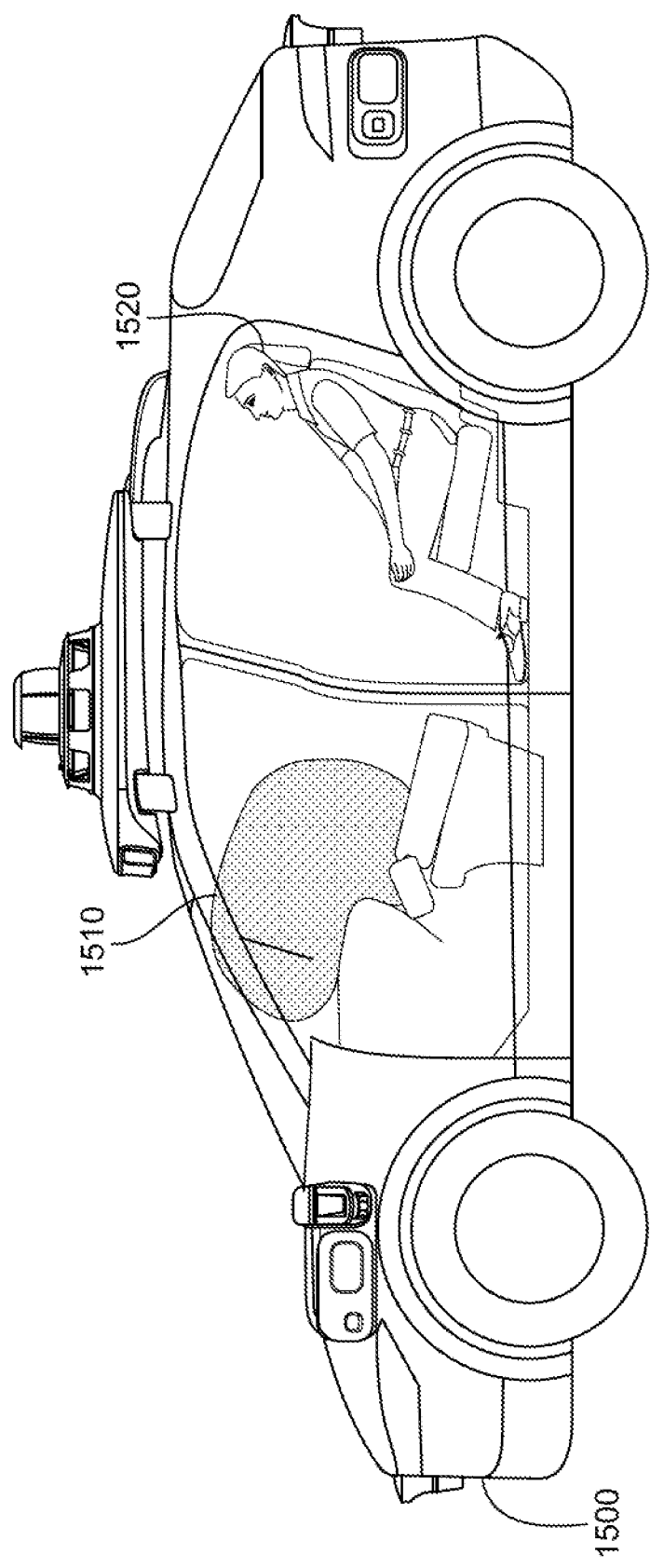
FIG. 15 is a side view of an interior of an autonomous vehicle in accordance with aspects of the disclosure.

Simply enlarging the size of frontal airbags may result in further complications and deployment issues related to ensuring the desired trajectory, stability, timing, power requirements, folding and other design issues as well as potentially creating higher pressures in the interior cabin when deployed. For example, as shown in FIG. 15, enlarging the size of the dashboard airbag 1410 to that of airbag 1510 may not provide adequate protection for the occupant 1520 of a vehicle 1500.

To address these shortcomings, the aforementioned typical seatback airbags may be replaced with an airbag system including a pair of chambers which can be inflated independently according to the orientation or folded/unfolded position of the seatback of each seat of the front row of seats. For example, each seat of the front row of seats may include a respective airbag system mounted on a rear-facing side of a seatback of the seat.

Each airbag system may include an airbag having first and second chambers, a dual-stage inflator in fluid communication with the first chamber via a first set of orifices and in fluid communication with the second chamber via a second set of orifices, and a gas orifice blocker mechanism. Each chamber may also include a respective vent.

The gas orifice blocker mechanism may rotate along a folding axis inside of the housing of the airbag system such that when the seatback is rotated to the partially folded position relative to a base of the seat, the gas orifice blocker mechanism may block the flow of gas to second set of orifices into the second chamber. As such, gasses may only enter into the first chamber, and only the first chamber may inflate sufficiently to provide protection for an occupant behind the first row of seating. Similarly, when the seatback is rotated to the fully folded position, the gas orifice blocker mechanism allows the flow of gas to the second set of orifices to the second chamber. As such, gasses may enter into both the first chamber and the second chamber.

In addition to the rotation of the orifice blocker mechanism, the dual-stage inflator may include multiple stages of inflator gasses. When the seatback is in the upright or partially folded orientation position, the first stage may be activated in order to, at least initially, inflate the first chamber. At some point later, the second stage may be activated in order to release the gas though the vent of the first chamber.

The airbag system can record the seatback position information (upright, partially folded or fully folded) and communicates with a control module so that the control module will decide to fire the first stage inflator and subsequently thereafter file the second stage inflator or to fire both the first and second stage inflator at the same time.

The airbag system described herein may provide better protection for occupants in a rear seat of an autonomous vehicle and in particular when such occupants are not wearing a seatbelt. Because the airbag system is located at the bases of each of the seats of the second row of seating, this may reduce the distance of the airbags to occupants in the second row of seating, providing significant benefits over the inefficiencies of typical frontal and seatback airbags when the first row of seating is fully folded. In addition, by providing the dual-stage and multi-chamber airbag with an orifice blocker may provide a better airbag profile and proper pressure to protect occupants in the second row of seating. In conjunction with the typical front airbags, these features may increase the number of soft impact surfaces and thereby may reduce the risk of severe injuries for the occupants of an autonomous vehicle.

Example Systems

Figure 1:
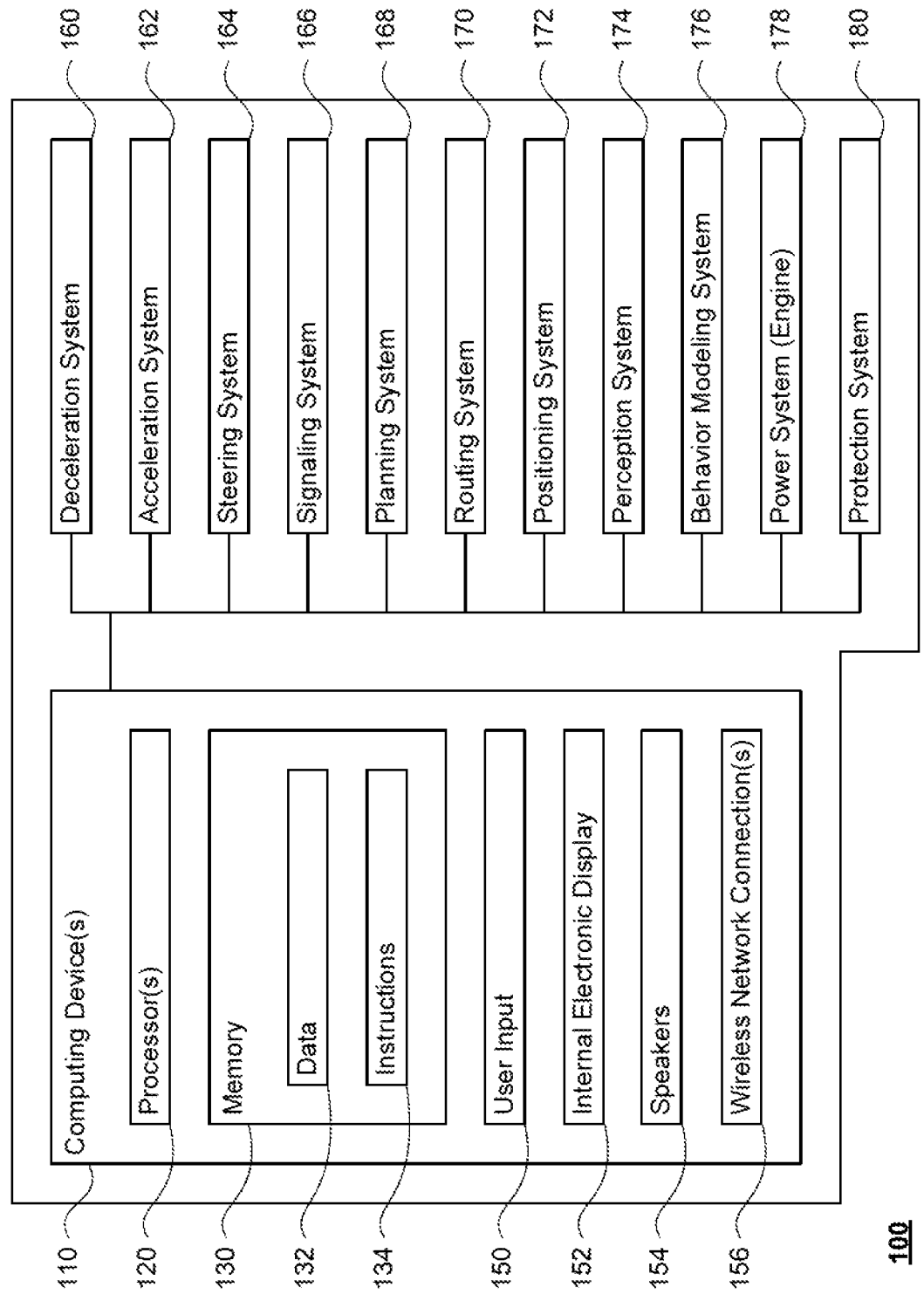
FIG. 1 is a functional diagram of an example vehicle in accordance with an exemplary embodiment.
Figure 2:
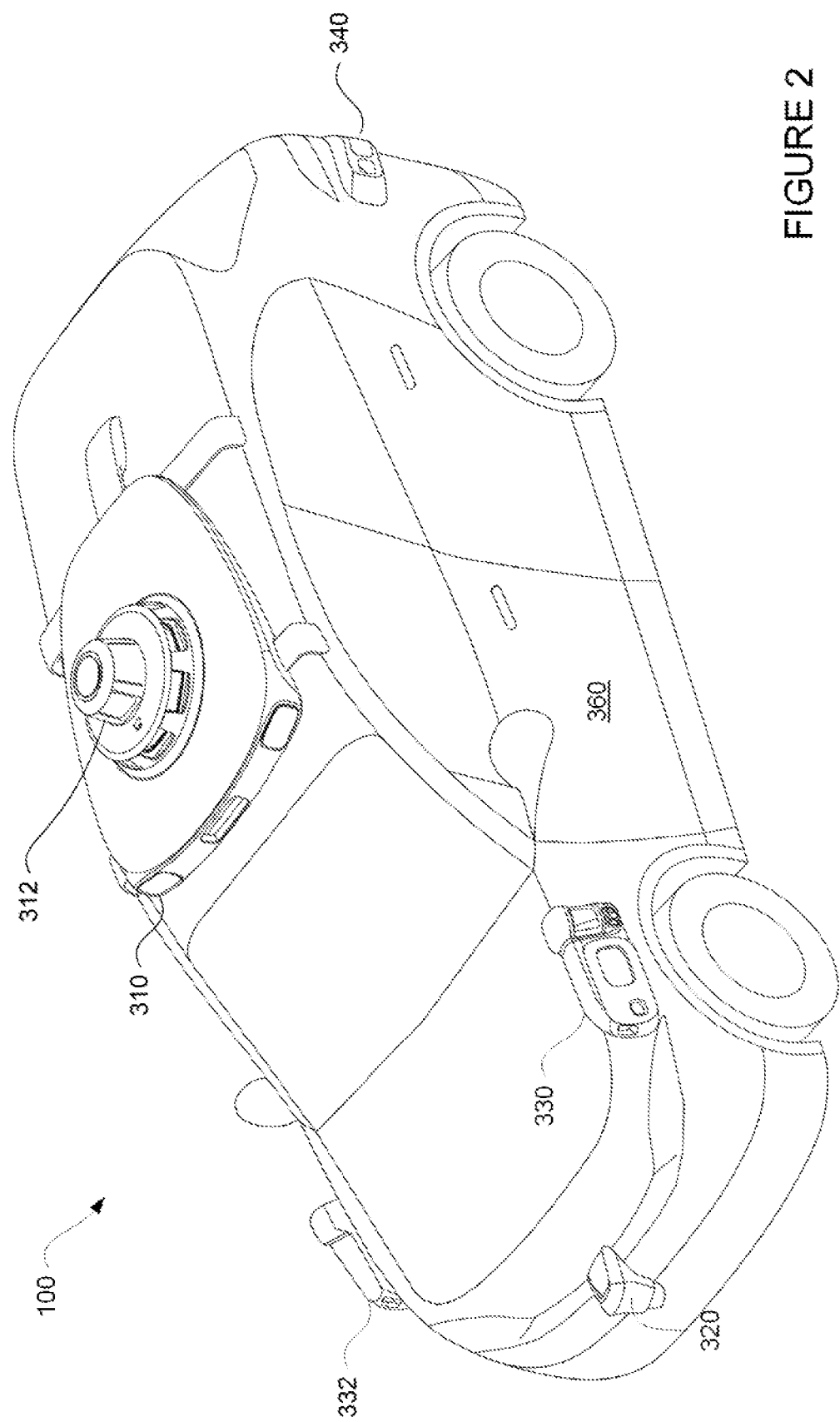
FIG. 2 is an example external view of a vehicle in accordance with aspects of the disclosure.

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3:
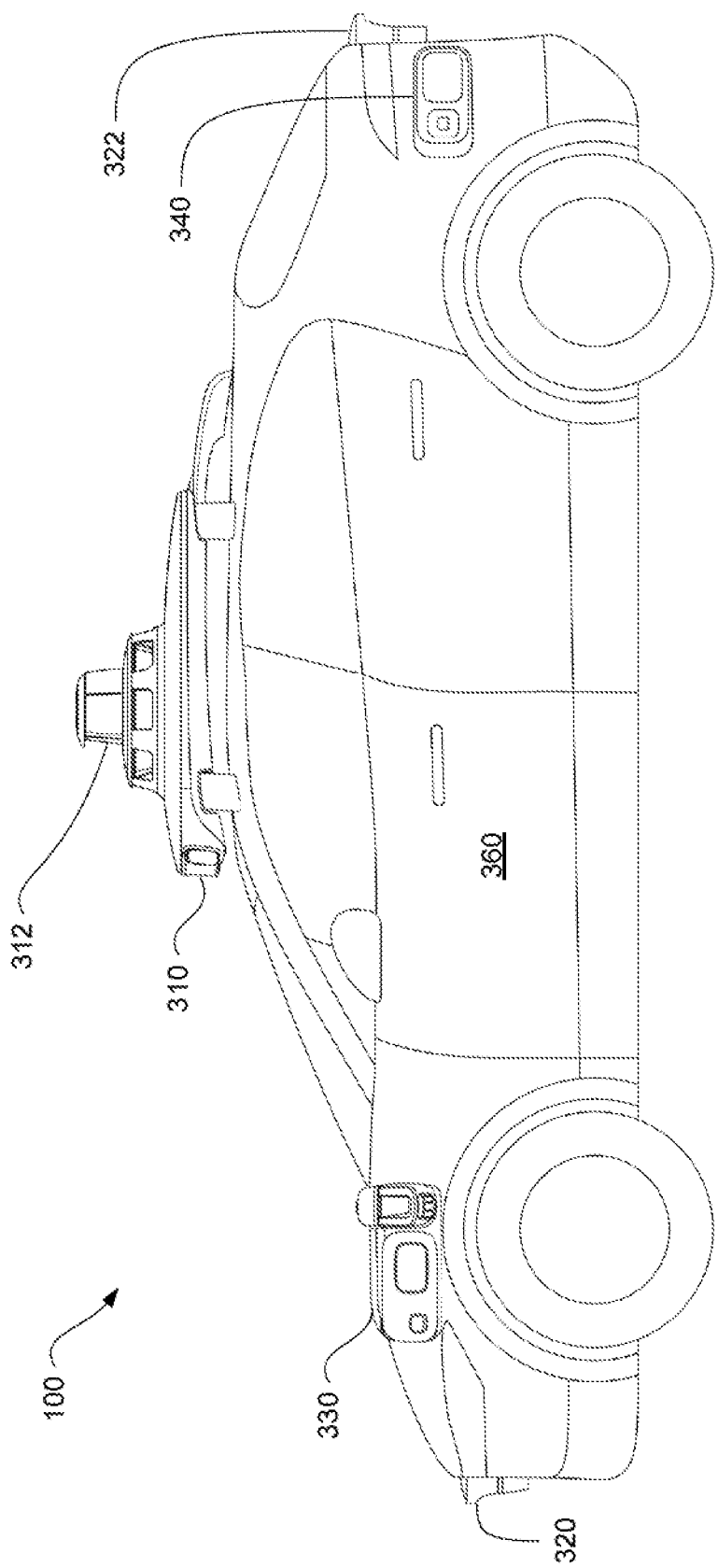
FIG. 3 is an example external view of a vehicle in accordance with aspects of the disclosure.

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
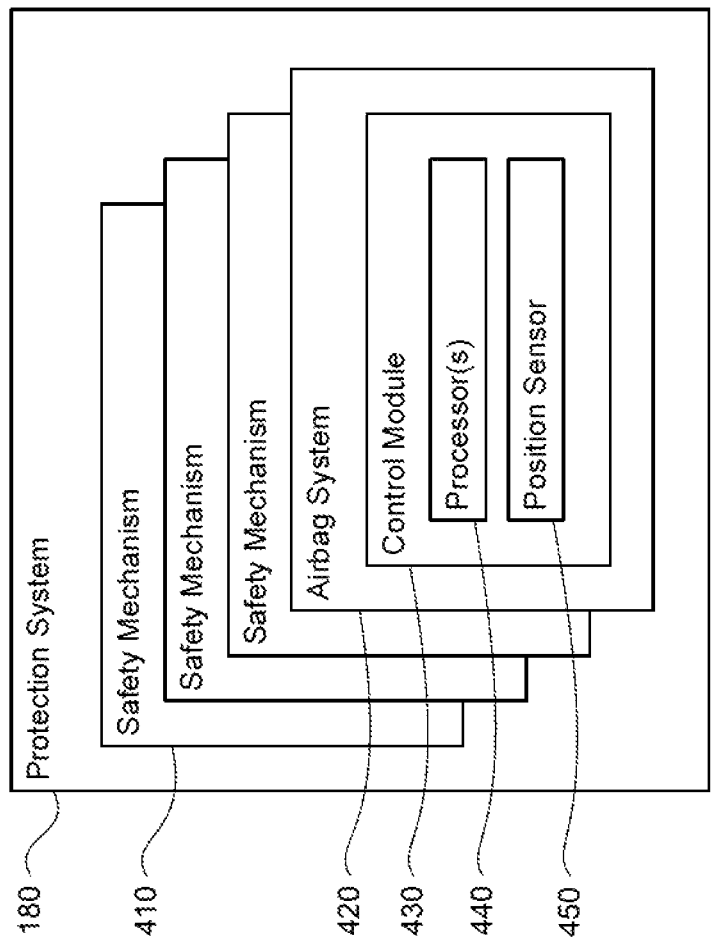
FIG. 4 is an example functional diagram of a protection system in accordance with aspects of the disclosure.

In some instances, information from the perception system 174 may be sent to various other systems in order to make decisions about when and how to deploy various safety mechanisms. In this regard, the perception system 174 may send the information to the computing devices 110 which make such decisions and forward activation instructions to protection system 180. Turning to FIG. 4, the protection system 180 may include one or more safety mechanisms 410. In this regard, the protection system 180 may deploy in accordance with the activation instructions. In another example, the perception system 174 may forward the information directly to the protection system 180 which makes then determines whether and how to deploy one or more safety mechanisms 410.

Thus, the autonomous vehicle may also include a plurality of safety mechanisms 410. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices (e.g., the computing devices 110, computing devices of the protection system 180, etc. when an impact is imminent).

The one or more safety mechanisms 410 may include one or more airbag systems 420 each including a respective control module 430 which, as discussed further below, may be used to control activation of a respective airbag system.

Each control module 430 may include one or more processors 440, configured similarly to the processors 120, which may be arranged to receive a signal, for example, from one or more processors of the protection system 180, computing devices 110, or perception system 174 and deploy the respective airbag system. In the example of the airbag system 420, each control module may include or may be communication with a position sensor 450 configured to detect the position of a seatback. In one example, the position sensor may be a simple switch. These airbag systems 420 may be arranged at different locations in and around the autonomous vehicle 100.

Figure 5:
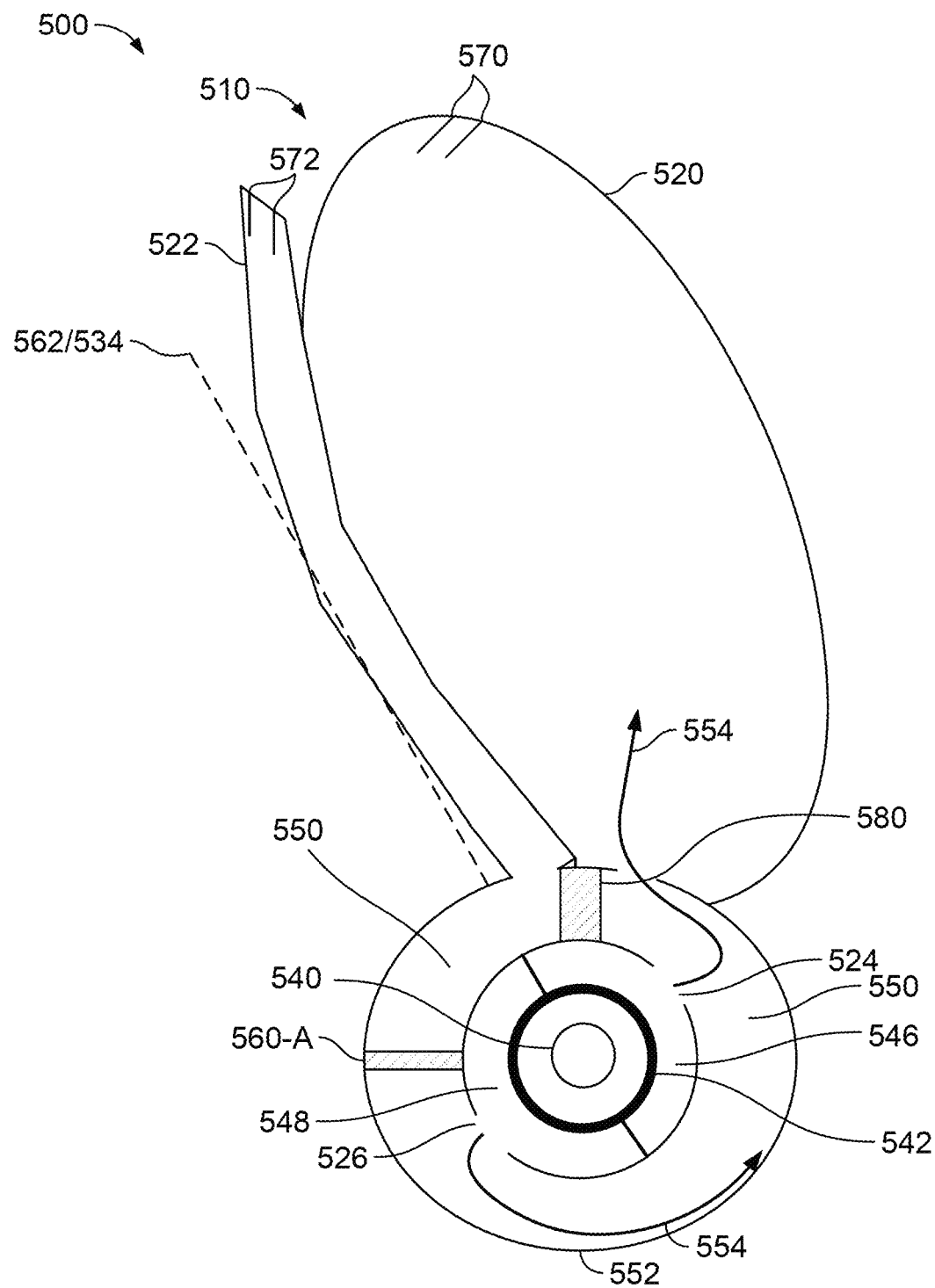
FIG. 5 is a partial side view of an airbag system in accordance with aspects of the disclosure.
Figure 6:
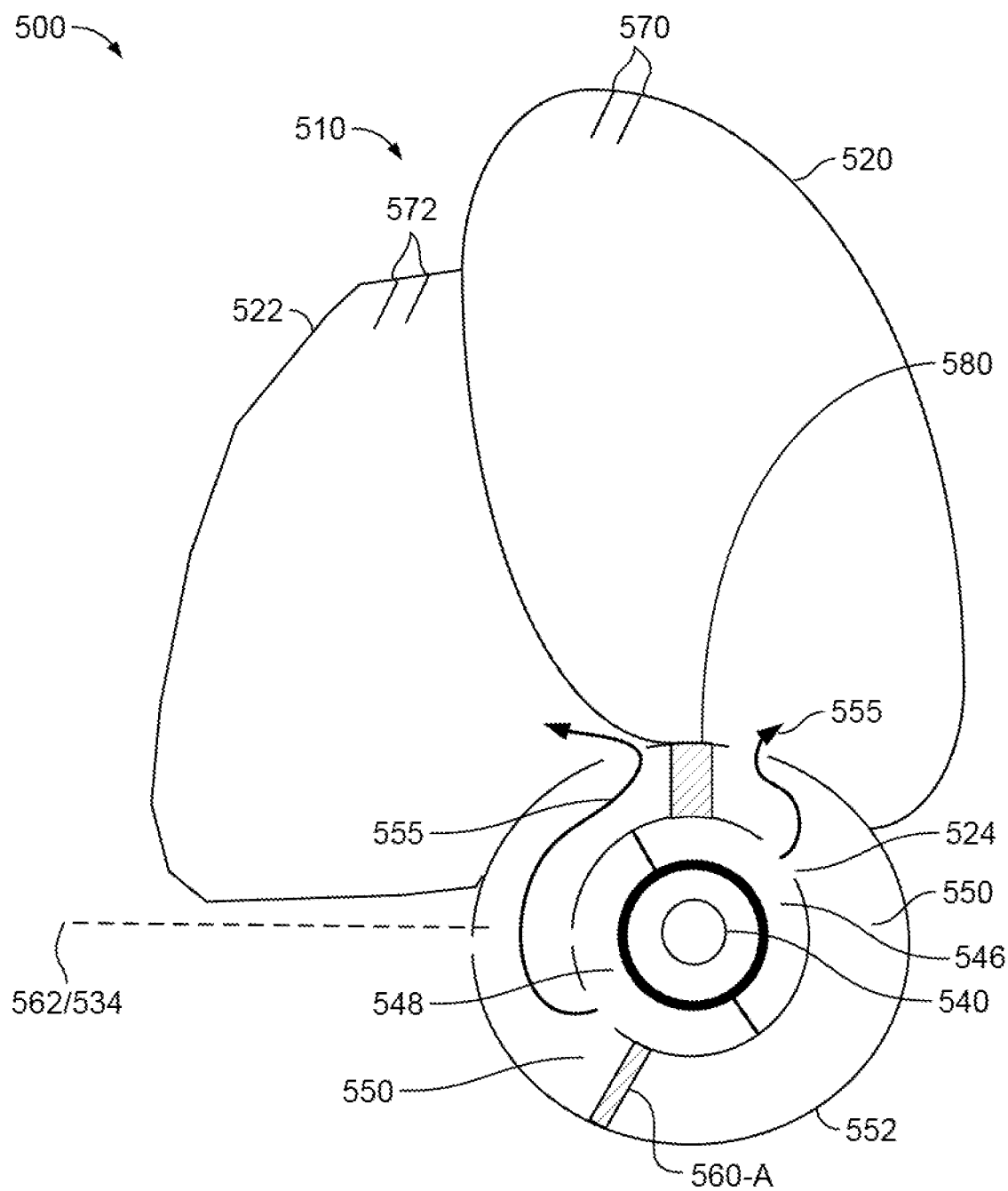
FIG. 6 is a partial side view of an airbag system in accordance with aspects of the disclosure.

For example, turning to the examples of FIGS. 5-6, the autonomous vehicle 100 may include an airbag system 500, corresponding to one of the airbag systems 420, including at least one airbag 510 having a pair of chambers 520, 522 which can be inflated independently according to the orientation or folded/unfolded position of the seatback 534 of each seat 532 of the front row of seats 530 (depicted in FIGS. 9-12). Similarly, in the examples of FIGS. 7-8, the autonomous vehicle 100 may include an airbag system 700, corresponding to one of the airbag systems 420, including at least one airbag 510 having a pair of chambers 520, 522 which can be inflated independently according to the orientation or folded/unfolded position of the seatback 534 of each seat 532 of the front row of seats 530 (depicted in FIGS. 9-12).

While only a single seat being depicted in the side-perspective views of FIGS. 9-12, a second seat (not shown) of the first row of seats 530 may be positioned directly behind the seat 532, and may also include a corresponding airbag system configured the same or similarly to airbag system 420. In this regard, each seat of the front row of seats 530 may include a respective airbag system mounted on a rear-facing side of a back of the seat.

Each airbag system 420 may also include a dual-stage inflator 540 in fluid communication with the first chamber 520 via an interior opening 550 and a first set of orifices 524. The dual-stage inflator 540 may also be in fluid communication with the second chamber 522 via an interior opening 550 of a housing 552 of the airbag system and a second set of orifices 526. A gas orifice blocker mechanism 560 may be arranged to move within the interior opening 550. Each of the first and second chambers 520, 522 may also include a respective vent 570, 572. In this regard, the first and second chambers 520, 522 may be configured as distinct airbags which can be deployed independently, or may be part of a larger single, airbag with two internal chambers.

The gas orifice blocker mechanism 560 may be formed or otherwise made from metals or other materials. The gas orifice blocker mechanism 560 may be a flat (e.g., linear structure) as depicted by gas blocker mechanism 560-A in FIGS. 5 and 6 or an arch-shaped shield as depicted by gas blocker mechanism 560-B in FIGS. 7 and 8. In the example of the arch-shaped shield, the gas blocker mechanism 560-B may also include a tail feature connected to or which is a part of the arch-shaped shield, and which rotates to block gas from the orifices 524 entering into the second chamber 522 (and also gas from the orifices 526 from entering into the first chamber 520 when the seat back is in the fully folded condition). In either case, the gas orifice blocker mechanisms 560-A, 560-B may function similarly, rotating with the seatback and blocking and unblocking gas flow from the second set of orifices 526 to the second chamber 520.

Figure 7:
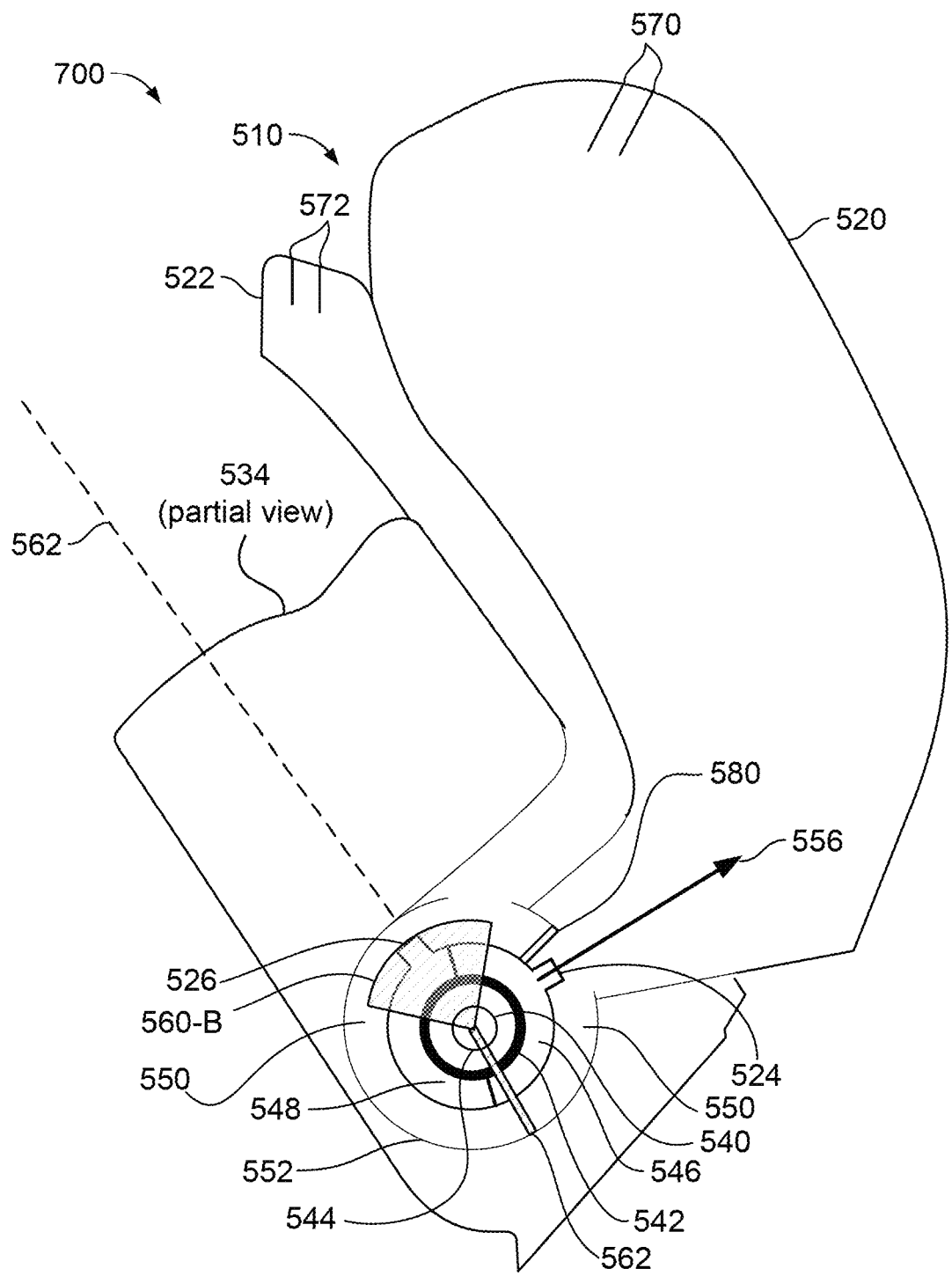
FIG. 7 is a partial side view of an airbag system in accordance with aspects of the disclosure.

As shown in FIGS. 5-7, the dual-stage inflator includes an interior body 542 housing a pair of cannisters (not shown) which when activated may provide gas into opposing sides 546, 548 of the dual-stage inflator 540. Each of the opposing sides includes a respective one of the openings 524, 526. In this regard, gas from the first canister of the pair may enter into the opposing side 548 and exit the dual-stage inflator via the orifices 526. Similarly, gas from the second canister of the pair may enter into the opposing side 546 and exit the dual-stage inflator via the orifices 524, 526. Thus, gas enters into the interior opening 550 via the orifices 524, 526.

An additional blocking structure 580 may be positioned between the gas orifices in order to prevent gas from moving 360 degrees around the interior opening 550. The dual-stage inflator also includes a mounting structure which may be attached to the seat base via brackets or screws. Thus, the dual-stage inflator may remain fixed relative to the seatbase as the seatback is rotated, while the housing may rotate with the seatback. In this regard, the additional blocking structure 580 may be fixedly attached to the dual-stage inflator 540, such that as the housing rotates, the additional blocking structure remains stationary relative to the dual-stage inflator 540. However, at the same time, as the housing rotates with the seatback, the gas blocker mechanism 560 also rotates.

Figure 9:
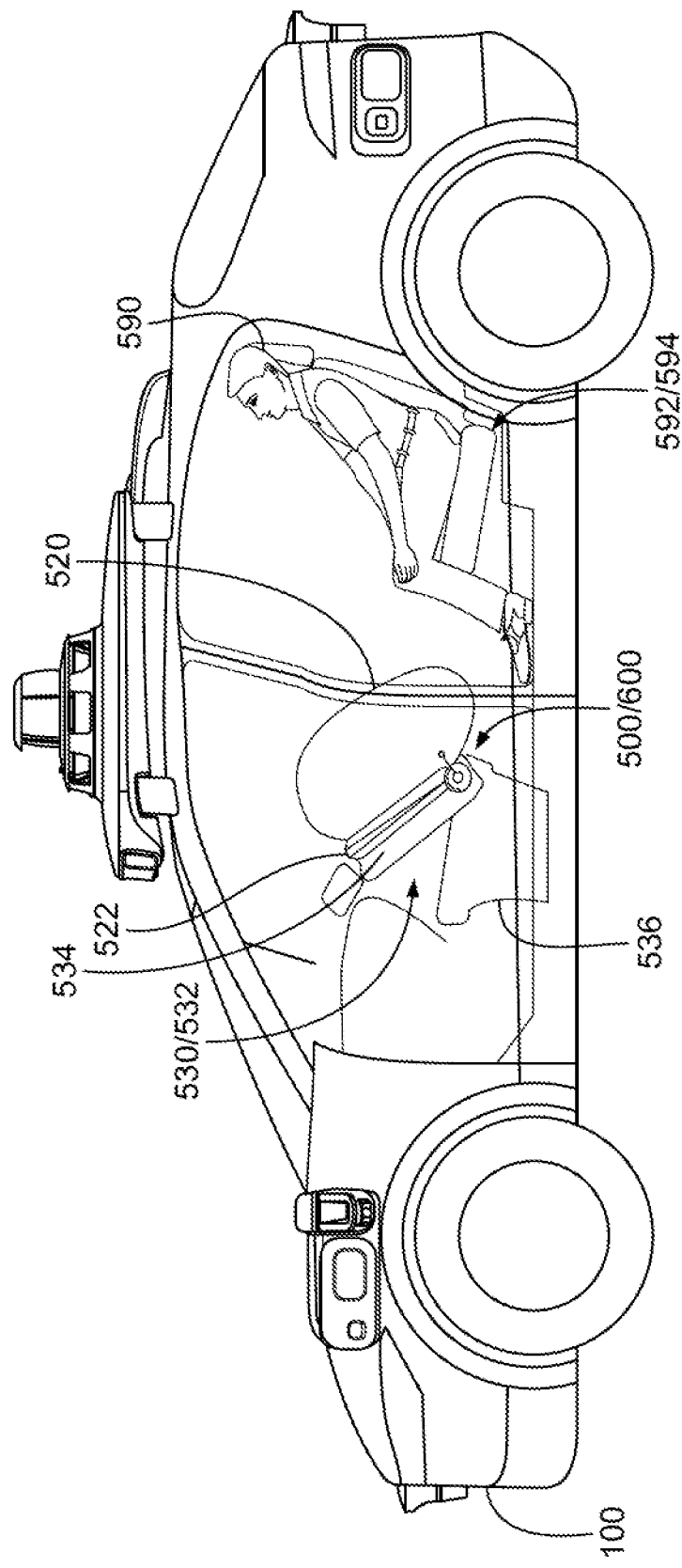
FIG. 9 is a side view of an interior of an autonomous vehicle in accordance with aspects of the disclosure.
Figure 11:
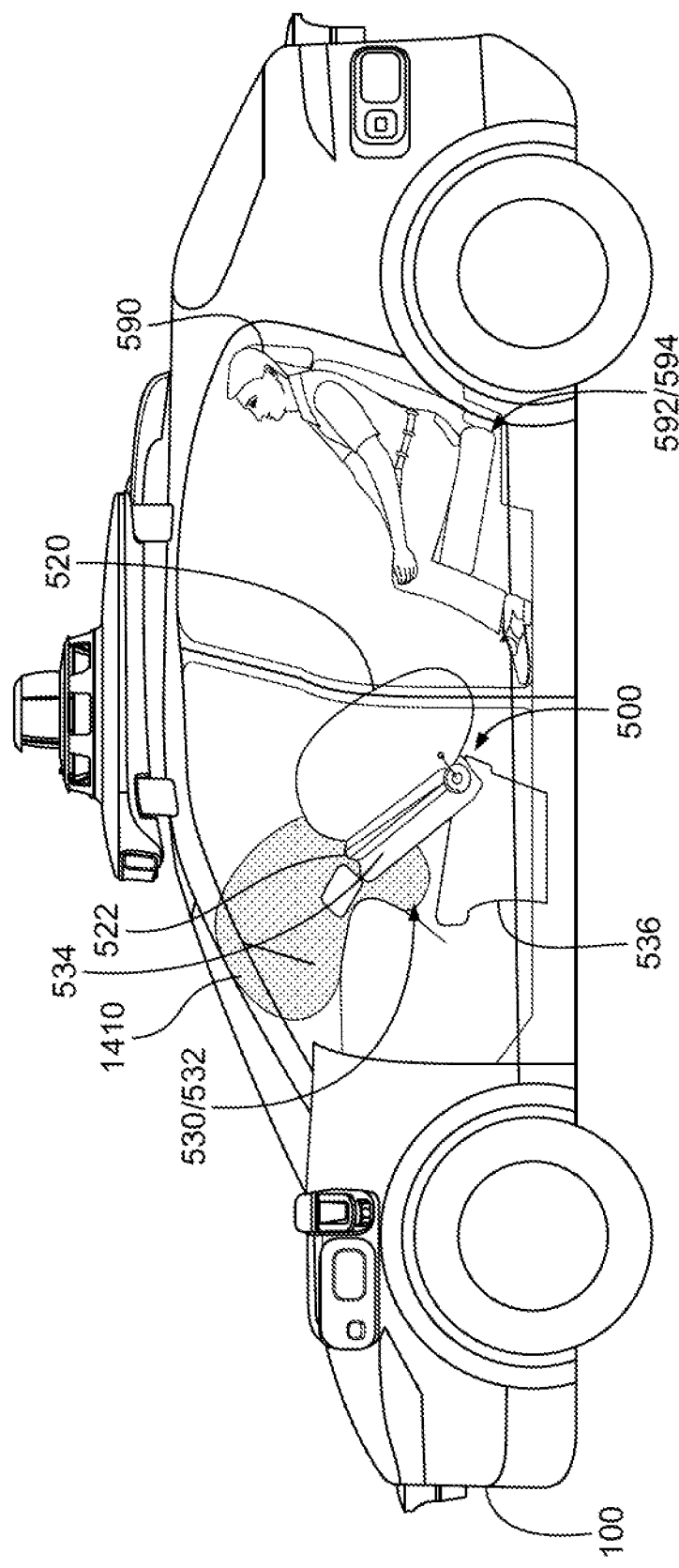
FIG. 11 is a side view of an interior of an autonomous vehicle in accordance with aspects of the disclosure.

As noted above, the gas orifice blocker mechanism 560 may rotate along a folding axis 562 within the interior opening 550 of the airbag system. The relative rotation of the gas orifice blocker 560 with respect to the second set of orifices 526, may allow the gas orifice blocker mechanism to block or unblock the flow of gas through the interior opening 550 to the second set of orifices 526. For instance, when the seatback 534 is rotated to the upright or partially folded position as depicted in FIGS. 5 and 7, the gas orifice blocker mechanism moves towards the second set of orifices 526 thereby effectively blocking gas from the second set of orifices 526 reaching the second chamber 522. When blocked, this may prevent or limit gas from entering the second chamber 522 of the pair of chambers when the seatback is in the upright or partially folded orientation or position relative to a base 536 of the seat 532 as depicted in FIGS. 9 and 11. As such, gasses may only enter into the first chamber 520 (the gas flow to which is never blocked), and only the first chamber 520 may inflate sufficiently to provide protection for an occupant 590 seated behind the first row of seating 530 in a seat 592 of a second row of seating 594. In the example of FIG. 5, gas may flow in the direction of the arrows 554, and in the example of FIG. 7, gas may flow in the direction of arrow 556 (gas from the orifice 526 being blocked by the gas orifice blocker mechanism 560-B). In this regard, FIG. 11 provides a comparison of the airbag system 420 when only the first chamber 520 is deployed compared to the deployed view of dashboard airbag 1410 of FIG. 14.

Figure 8:
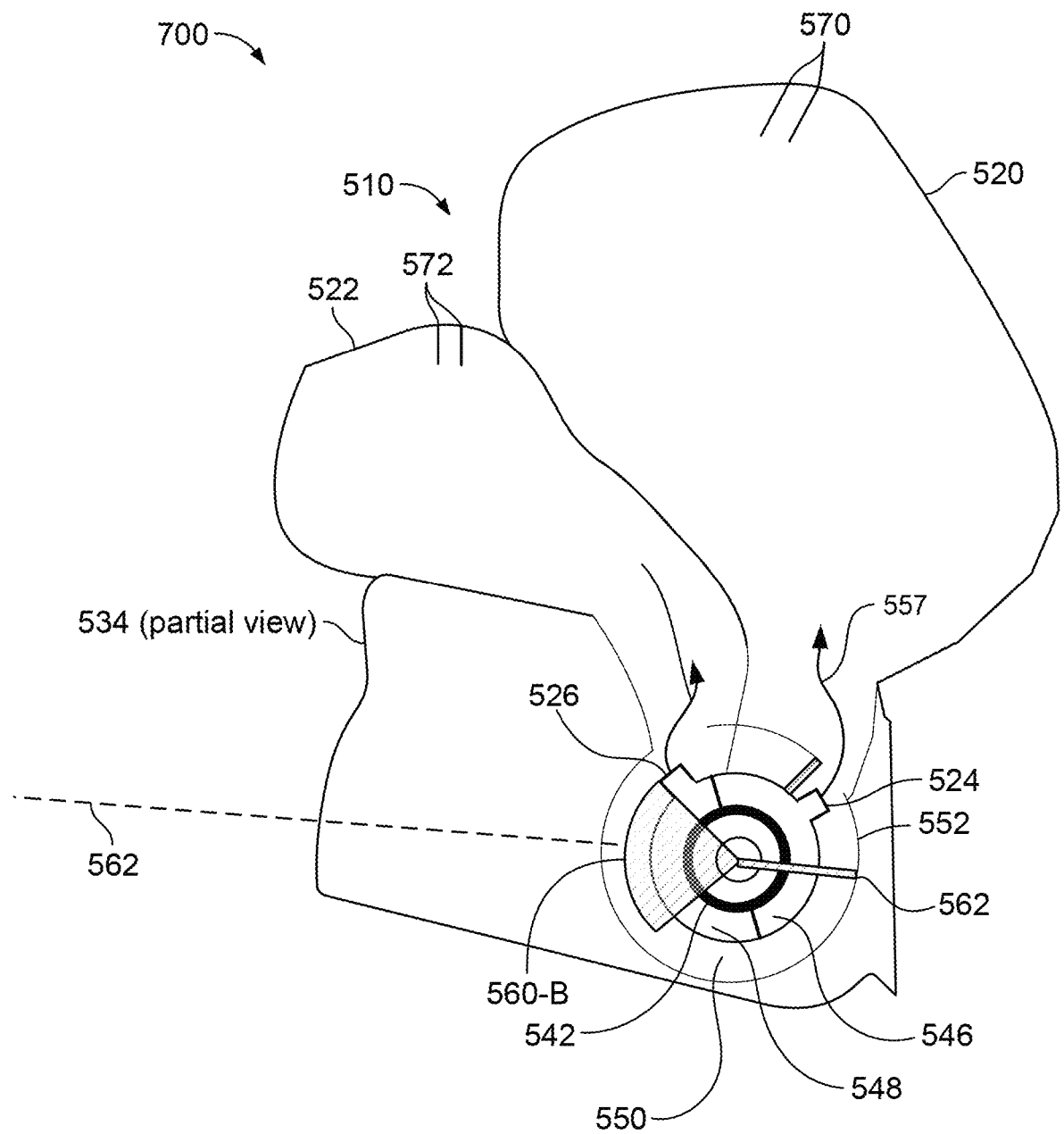
FIG. 8 is a partial side view of an airbag system in accordance with aspects of the disclosure.
Figure 10:
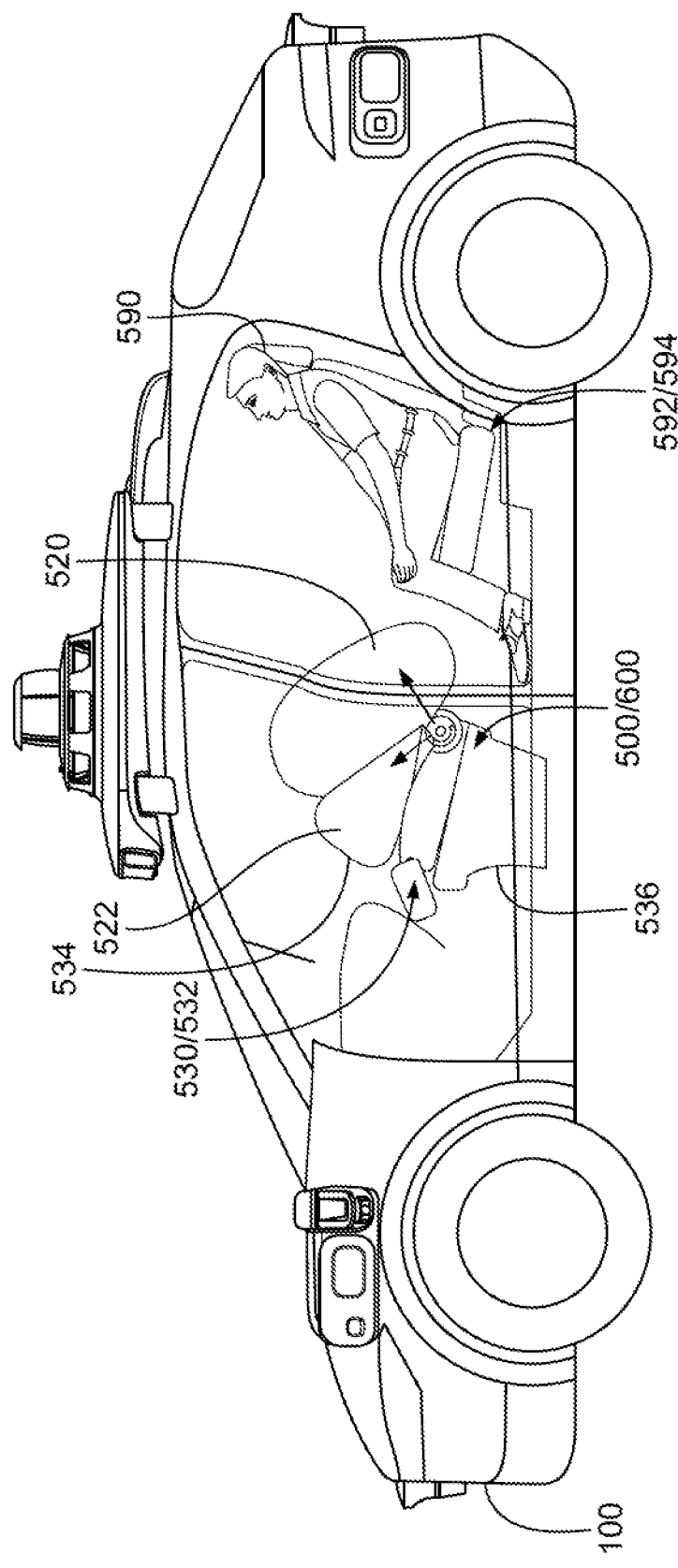
FIG. 10 is a side view of an interior of an autonomous vehicle in accordance with aspects of the disclosure.
Figure 12:
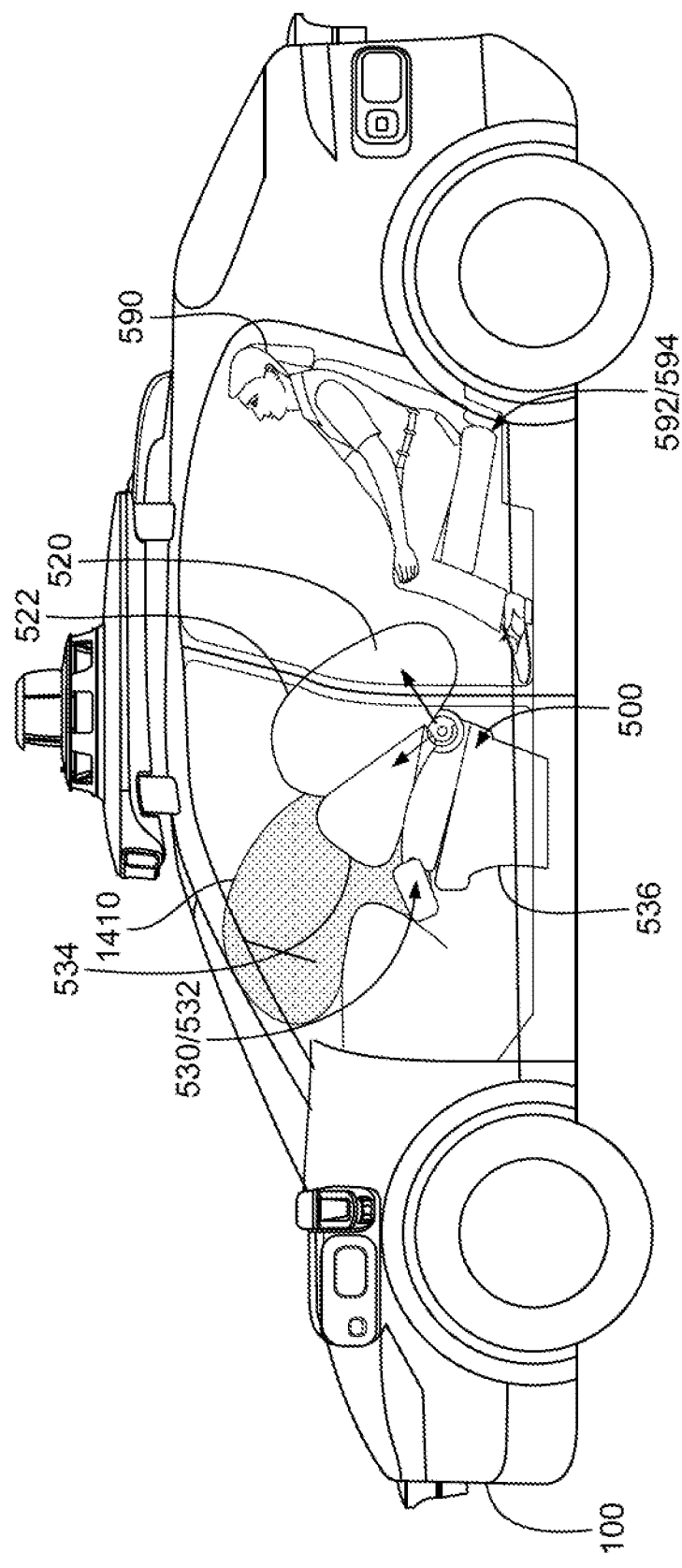
FIG. 12 is a side view of an interior of an autonomous vehicle in accordance with aspects of the disclosure.

Similarly, when the seatback is rotated to the fully folded position relative to the base 536 of the seat 532 as depicted in FIGS. 6 and 8, the gas orifice blocker mechanism 560 may move away from the second set of orifices 526 and allows gas to flow through the interior opening 550 and to the second set of orifices. As such, the gas is able to enter both the first chamber 520 and the second chamber 522. In the example of FIG. 6, gas may flow in the direction of the arrows 555, and in the example of FIG. 8, gas may flow in the direction of arrow 557. Thus, both the first and second chambers may inflate sufficiently to provide protection for occupant 590 seated behind the first row of seating 530 in a seat 592 of a second row of seating 594 as depicted in FIGS. 10 and 12. In this regard, FIG. 12 provides a comparison of the airbag system 420 when only the first chamber 520 is deployed compared to the deployed view of airbag 1510 of FIG. 15.

In addition to the rotation of the orifice blocker mechanism 560, the dual-stage inflator 540 may include multiple stages of inflator gasses. When the seatback 534 is in the upright or partially folded position as depicted in FIGS. 5 and 7, a first stage of the dual-stage inflator 540 may be activated in order to, at least initially, inflate the first chamber 520. At some point later (e.g., 100 milliseconds later), a second stage of the dual-stage inflator 540 may be activated in order to release the gas. However, at this point, the gas from the second stage will still go into the first chamber 520, but may immediately vent out via the vent 570 the first chamber (which may be partially or fully expanded at this point). When the seatback is in the fully folded position, both the first and second stages of the dual-stage inflator 540 may be activated at the same time in order to inflate both the first and second chambers 520, 522 simultaneously.

The airbag system 420 can track and record the seatback position information and communicates with the control module 430. For instance, this position information may be detected based upon the condition of the position sensor 450. In the example of a switch with on and off conditions, depending upon the position of the seatback, the switch may be in an on condition or an off condition. For example, as the seatback rotates from the upright position or partially folded condition to the fully folded condition, this may cause the switch to change from the on condition to the off condition (or from the off condition to the on condition depending upon the placement and configuration of the switch). One of these conditions (e.g., the on condition) may correspond to the seatback 534 being in the fully folded position, and the other of these conditions (e.g., the off condition) may correspond to the seatback being in the upright or partially folded position. Of course, the reverse may also be true; the on condition may correspond to the seatback in the upright or partially folded position and the off condition may correspond to the seatback being in the fully folded position. This may enable the control module 430 to send a signal to cause the dual-stage inflator 540 to fire the first and second stages sequentially or one after the other (if in the upright or partially folded position) or to fire both the first and second stages at the same time (if in the fully folded position). In this regard, the control model may be considered a part of or incorporated into or part of an advanced restraint system.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 13:
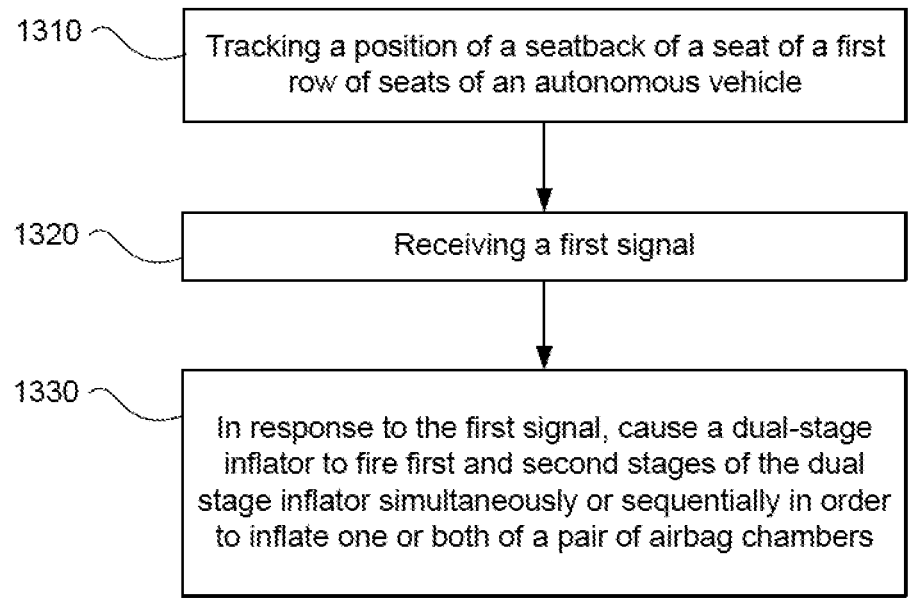
FIG. 13 is an example flow diagram in accordance with aspects of the disclosure.

FIG. 13 provides an example flow diagram 1300 for activating an airbag system, which may be performed by one or more processors, such as the one or more processors 440 of the control module. For example, at block 1310, the position of a seatback of a seat of a first row of seats of an autonomous vehicle may be tracked. As indicated above, this position may correspond to whether the seatback 534 is in the upright, partially folded, or fully folded positions as described above.

At block 1320, a first signal is received. This first signal may indicate that a collision is imminent such that the airbag system 420 should be deployed. For example, as discussed above, the control module 430 may receive a signal from one or more processors of the protection system 180, computing devices 110, or perception system 174 indicating that the airbag system is to be deployed.

At block 1330, in response to the first signal, causing a dual-stage inflator to fire first and second stages of the dual-stage inflator simultaneously or sequentially in order to inflate one or both of a pair of airbag chambers. This may enable the airbag system to provide protection to an occupant of the autonomous vehicle seated in a second row of seats (e.g., behind the first row of seats). For instance, based on information from the position sensor 450, such as the condition of a switch, the control module 430 may cause the dual-stage inflator to fire the first and second stages sequentially or simultaneously. For example, if the seatback 534 is in the upright or partially folded condition (described above and as depicted in FIGS. 5, 7, 9 and 11), the control module 430 may send a signal to cause the dual-stage inflator 540 to fire the first and second stages sequentially or one after the other. Similarly, if the seatback 534 is in the fully folded condition (described above and as depicted in FIGS. 6, 8, 10 and 12), the control module 430 may send a signal to cause the dual-stage inflator 540 to fire both the first and second stages at the same time.

The airbag system described herein may provide better protection for occupants in a rear seat of an autonomous vehicle and in particular when such occupants are not wearing a seatbelt. Because the airbag system is located at the seatback of each of the seats of the second row of seating, this may reduce the distance of the airbags to occupants in the second row of seating, providing significant benefits over the inefficiencies of typical frontal and seatback airbags when the first row of seating is in the fully folded position. In addition, by providing the dual-stage and multi-chamber airbag with an orifice blocker may provide a better airbag profile and proper pressure to protect occupants in the second row of seating. In conjunction with the typical front airbags, these features may increase the number of soft impact surfaces and thereby may reduce the risk of severe injuries for the occupants of an autonomous vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. An airbag system, the system comprising:
   a first chamber;
   a second chamber;
   a dual-stage inflator in fluid communication with the first chamber via a first orifice and in fluid communication with the second chamber via a second orifice;
   an orifice blocker mechanism configured to block and unblock gas flow from the second orifice to the second chamber, wherein the orifice blocker mechanism is configured to block and unblock the gas flow depending on a relative rotation of the orifice blocker mechanism, wherein the dual-stage inflator is configured to inflate one or both of the first chamber and the second chamber with gas based on a position of the orifice blocker mechanism relative to the second orifice; and a seat including a seatback and a base, wherein the seatback and orifice blocker mechanism are arranged such that rotation of the seatback relative to the base causes the orifice blocker mechanism to rotate.

2. The system of claim 1, wherein each of the first chamber and the second chamber include a respective vent configured to vent the gas.

3. The system of claim 1, wherein the first chamber and the second chamber are chambers of a single airbag.

4. The system of claim 1, wherein the first chamber and the second chamber are chambers of distinct airbags.

5. The system of claim 1, wherein the first and second chambers are arranged in a housing of the seatback prior to inflation.

6. The system of claim 1, wherein the orifice blocker mechanism is configured to block and unblock gas flow by rotating about a folding axis of the seat.

7. The system of claim 1, wherein the seatback and the orifice blocker mechanism are arranged such that, when the seatback is in an upright position, the orifice blocker mechanism blocks one of the first orifice or the second orifice.

8. The system of claim 7, wherein the seatback and the orifice blocker mechanism are arranged such that when the seatback is in a folded position, the orifice blocker mechanism does not block the gas flow from the second orifice to the second chamber.

9. The system of claim 1, wherein the dual-stage inflator is configured to activate a first stage in order to initially inflate one of the first chamber or the second chamber when the seatback is in an upright position such that only the first chamber can inflate sufficiently to provide protection for an occupant of a vehicle.

10. The system of claim 9, wherein the dual-stage inflator is configured to activate a first stage in order to inflate both of the first chamber and the second chamber when the seatback is in a folded position such that both the first chamber and the second chamber can inflate sufficiently to provide protection for the occupant of the vehicle.

11. The system of claim 1, wherein:
the seat is a first seat including the seatback and the base; and
the system further comprises a vehicle including:
the first seat in which the first and second chambers are arranged in the first seat prior to inflation; and
a second seat located behind the first seat, wherein the first chamber and the second chamber are sized to protect an occupant of the vehicle in the second seat when one or both of the first chamber and the second chamber are inflated with gas based on the position of the orifice blocker mechanism.

12. An airbag system, the system comprising:
a first chamber;
a second chamber;
a dual-stage inflator in fluid communication with the first chamber via a first orifice and in fluid communication with the second chamber via a second orifice;
an orifice blocker mechanism configured to block and unblock gas flow from the second orifice to the second chamber,
wherein the dual-stage inflator is configured to inflate one or both of the first chamber and the second chamber with gas based on a position of the orifice blocker mechanism relative to the second orifice; and
a seat in which the first and second chambers are arranged in the seat prior to inflation.

13. The system of claim 12, wherein the first and second chambers are arranged in a seatback of the seat prior to inflation.

14. The system of claim 12, wherein the orifice blocker mechanism is configured to block and unblock one of the first orifice or the second orifice by rotating about a folding axis of the seat.

15. The system of claim 14, wherein the seat and the orifice blocker mechanism are arranged such that when the seat is in an upright position, the orifice blocker mechanism is configured to block the gas flow from the second orifice to the second chamber.

16. The system of claim 15, wherein the seat and the orifice blocker mechanism are arranged such that when the seat is in a folded position, the orifice blocker mechanism is configured to not block gas flow from the second orifice to the second chamber.

17. The system of claim 14, wherein the dual-stage inflator is configured to activate a first stage in order to initially inflate one of the first chamber or the second chamber when the seat is in an upright position such that only the first chamber can inflate sufficiently to provide protection for an occupant of a vehicle.

18. The system of claim 17, wherein the dual-stage inflator is configured to activate a second stage in order to inflate both of the first chamber and the second chamber when the seat is in a folded position such that both the first chamber and the second chamber can inflate sufficiently to provide protection for the occupant of the vehicle.

19. The system of claim 12, wherein the seat is a first seat, and wherein the system further comprises:
a vehicle; and
a second seat located behind the first seat, wherein the first chamber and the second chamber are sized to protect an occupant of the vehicle in the second seat when one or both of the first chamber and the second chamber are inflated with gas based on the position of the orifice blocker mechanism.

20. The system of claim 19, wherein the first seat includes a seatback and a base, wherein the seatback and the orifice blocker mechanism are arranged such that rotation of the seatback relative to the base causes the orifice blocker mechanism to rotate.

* * * * *